Jan. 2, 1951        O. E. JANSON        2,536,687

LIVE CENTER

Filed Nov. 8, 1947

Inventor

Oscar E. Janson

By Barlow & Barlow

Attorneys

Patented Jan. 2, 1951

2,536,687

UNITED STATES PATENT OFFICE 2,536,687

LIVE CENTER

Oscar E. Janson, Providence, R. I.

Application November 8, 1947, Serial No. 784,911

2 Claims. (Cl. 82—33)

This invention relates to a so-called live center or one rotating with the work, and one which is resiliently mounted to yieldingly press against the end of the work and follow the end of the work should it move axially.

Centers of this general type were previously provided with roller or ball bearings which bearings would axially slide with the center as the center moved to follow the work. Such previous arrangement required an expensive construction and considerable pressure for the relative movement of the bearing.

One of the objects of this invention is to provide a center which will rotate with the work and will axially slide itself relative to the bearing, which takes up the compressive lateral transversely acting forces which are applied thereto.

More specifically an object of this invention is to permit a relative movement of the center and its axially-acting bearing as distinguished from a major portion of the unit comprising the lateral thrust take-up ball bearing.

Another object of the invention is to simplify the construction throughout so that the same may be made much less expensively than live centers which will accomplish the results of this center which have heretofore been made.

With these and other objects in view, the invention consists of certain novel features of construction as will be more fully described and particularly pointed out in the appended claims.

Figure 1:
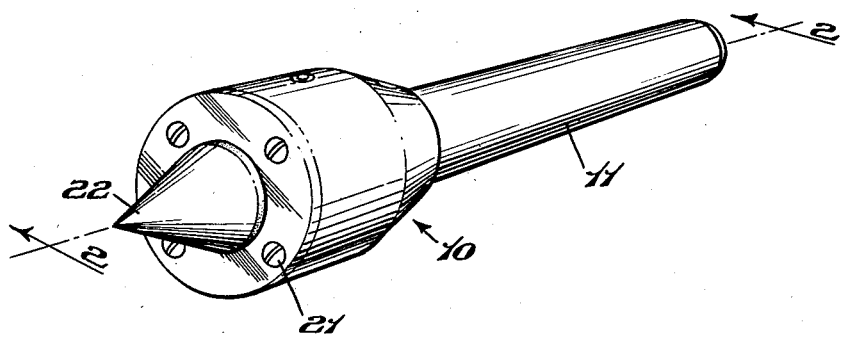
Figure 1 is a perspective view of the live center.

In proceeding with this invention, I provide a casing in which there is fixedly mounted a double row ball bearing which cannot move axially with reference to the unit. A center is slidably mounted in this long double ball bearing and is axially urged outwardly by a spring. Between the spring and the center itself is a thrust bearing to absorb the compressive forces acting in a longitudinal direction of the center, which bearing will slide with the center in its movement against the resilient acting spring.

With reference to the drawings, 10 designates generally a casing which is provided on the end of a tapered arbor 11 which is formed to be received in some machine part to take it. Casing 10 is provided with an internal bore 12 which fits upon the reduced portion 13 of the arbor 11 and seats against a shoulder 14 formed by this reduced portion. The interior of this reduced portion is provided with a further bore 15 for the purposes which will presently appear. Casing 10 and the arbor are held together by a set screw 16 which may be threaded into engagement with this reduced portion 13.

At the outer end of the casing there is provided a larger bore 17 forming a shoulder 18 against which a long double ball bearing 19 is positioned to absorb the compressive lateral or radial forces. This ball bearing is held snugly against the shoulder 18 by a plate 20 which is provided with screws 21 to hold it in place, and also retain the ball bearing in fixed position against axial movement in either direction.

Figure 2:
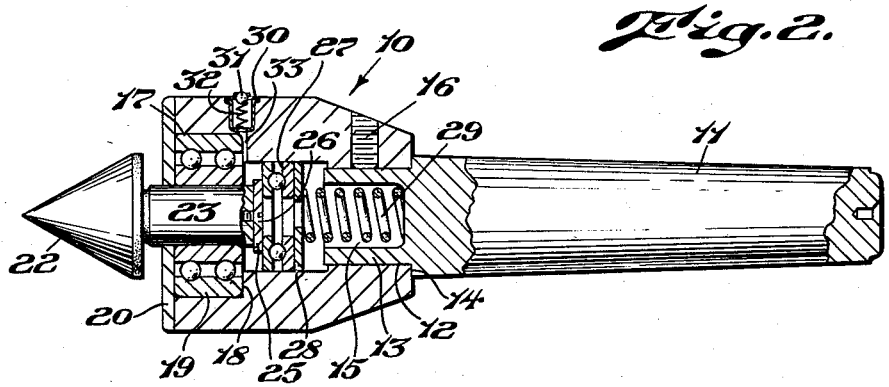
Figure 2 is a sectional view substantially on line 2—2 of Figure 1.
Figure 3:
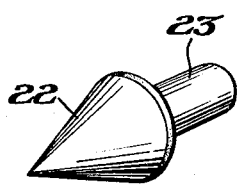
Figure 3 is a perspective view of the center alone.

A center consisting of a conical head 22 and a shank 23 is slidably received in the ball bearing so that the same may have axial movement through this ball bearing. A washer 25 is applied on the end of the shank 23 and held thereto by a screw 26. This washer in turn butts against thrust bearing designated generally 27 which serves to take the longitudinal thrust or axial thrust on the center. This thrust bearing is axially movable in the bore 28 between the bores 12 and 17 which extends inwardly from the opposite end of the casing, and there is also provided a disk against which the helical spring 29 acts to force the thrust bearing and the center outwardly or to the left as shown in Figure 2. The opposite end of this spring 29 seats in the bore 15 formed in the end of the arbor 11.

In operation, as pressure is placed upon the head 22 of the live center, it will be forced inwardly so as to place the spring under compression and if there is any change in the length of the work which the live center engages, it may be compensated for by the spring which may be either further compressed or may follow outwardly should the piece of work shorten. The transverse compressive forces will be taken care of by the ball bearing while the longitudinal or axial compressive forces will be taken care of anti-frictionally by the thrust bearing 27. By this arrangement, merely the center itself which is a small part of the structure will move in and out through the ball bearing and nicely follow the work without the necessity of movement of the larger ball bearing or a part thereof which would not be turning or rotating in the casing. A much nicer action is therefore provided by sliding between rotating parts rather than between parts which are not rotating, and the structure is such as to more nicely follow the work.

Lubrication may be provided through the cup 30 having a ball 31 to close it by means of spring 32 or may enter through the radial hole 33.

I claim:

1. A live center unit for a lathe or the like comprising a casing provided with a bore extending axially therethrough and opening out of both ends thereof, an arbor having end means removably secured in the bore at one end of the casing, an annular anti-friction bearing providing a through concentric aperture fixedly mounted at the other end of the casing and extending inwardly to provide a shoulder at the inward end thereof, a center having a shank of smaller diameter slidable in said bearing aperture and provided with a threaded hole in its inner end, a washer of a size larger than said shank abutting said inner end and positioned against said bearing shoulder, a screw having a slotted head threaded into said hole with its head engaging said washer to hold the same secured to said shank to provide a stop to limit outward movement of said shank through said bearing aperture, and means including a spring acting between said arbor and washer to urge said center outwardly, said arbor and spring being removable to afford access to said screw from one end of said casing for removing said washer to permit removal of the center from its bearing from the other end of the casing without removing said bearing.

2. A live center unit as in claim 1 wherein a ball thrust bearing abutting said washer is interposed between said spring and washer, said bearing having an open center aperture to expose said screw.

OSCAR E. JANSON.

REFERENCES CITED

The following references are of record in the file of this patent:

UNITED STATES PATENTS

| Number | Name | Date |
| --- | --- | --- |
| 1,700,837 | Fisher | Feb. 5, 1929 |
| 1,742,451 | Schnelle | Jan. 7, 1930 |
| 2,402,979 | Barto | July 2, 1946 |
| 2,426,566 | Reinsch | Aug. 26, 1947 |